Jan. 15, 1924.
W. E. PLUMMER ET AL
PACKING
Filed Aug. 28, 1920
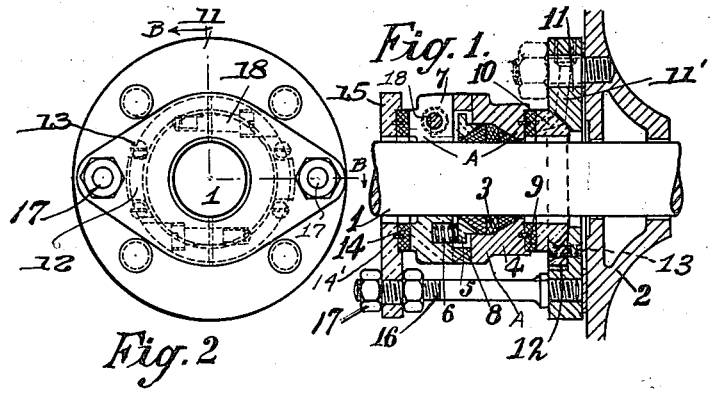
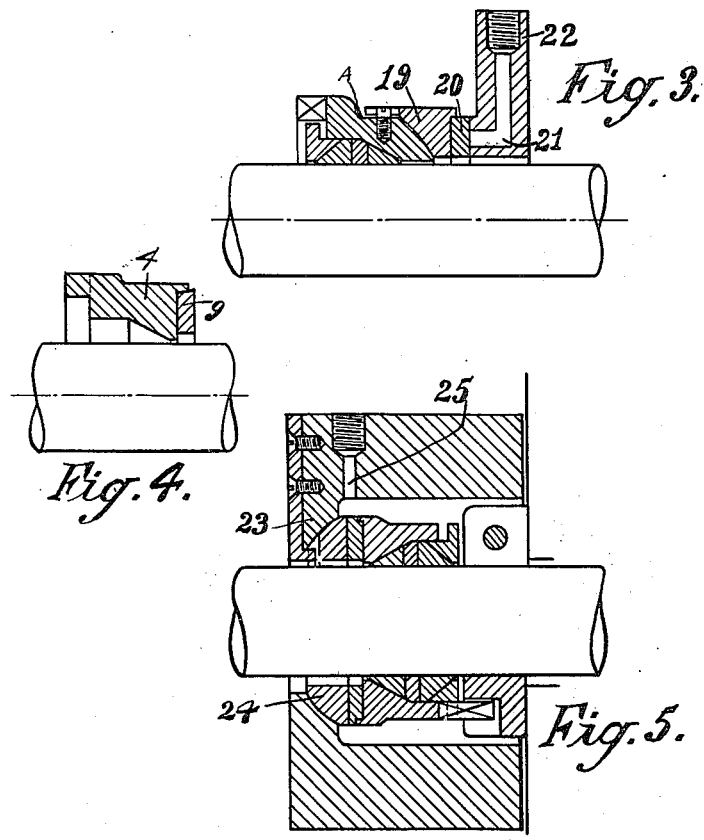

Patented Jan. 15, 1924.

1,480,951

UNITED STATES PATENT OFFICE.

WILLIAM EDGAR PLUMMER, WILLIAM MARSDEN KERMODE, AND CHARLES ST. CLAIR PLUMMER, OF BRADFORD, ENGLAND.

PACKING.

Application filed August 28, 1920. Serial No. 406,543.

*To all whom it may concern:*

Be it known that we, WILLIAM EDGAR PLUMMER, WILLIAM MARSDEN KERMODE, and CHARLES ST. CLAIR PLUMMER, subjects of the King of Great Britain, residing at Bradford, in the county of York and Kingdom of England, have invented certain new and useful Improvements in Packings, of which the following is a specification.

The present invention relates to improvements in packings suitable for elements rotating relatively to one another of the type in which the housing for the packing gland engaging, and rotating with the shaft, has a radial bearing surface on it engaging a similar surface on the fixed bearing part or on a renewable ring attached thereto.

According to the present invention, the gland housing rotating with the shaft which is engaged by its adjustable packing, has a radial bearing surface engaging a similar stationary bearing surface, a spherical bearing ring being interposed between the stationary casing and the said housing.

The invention is more particularly described with reference to the accompanying drawings in which:—

Figure 1 is a side view of Figure 2 looking horizontally in the direction of the upper arrow on the vertical portion of line B—B, and also looking vertically downwardly in the direction of the vertical arrow B on the horizontal portion of line B—B.

Figure 2 is a corresponding partial side view.

Figure 3 is a modified form of construction in side sectional elevation.

Figure 4 shows a further modification.

Figure 5 is a further modification in side sectional elevation.

A rotary shaft 1 is taken by way of example, to be driving the impeller of a centrifugal pump or the like, and the joint between the casing 2 and the shaft 1 is maintained tight by means of packing rings 3. These rings are arranged within a recessed ring forming a portion of a gland housing A, and are maintained tight by means of a flanged tapered socket ring 5 which receives axial pressure from a number of springs arranged in the sockets 6. These sockets are formed in a pinch ring 7 forming the other part of the gland housing. Pinch ring 7 is also secured to shaft 1 in any suitable manner as by keying. This pinch ring 7 has teeth 8 formed on it which are adapted to engage with corresponding teeth on the ring 4 so that ring 4 and consequently packing 3 rotate with pinch ring 7. Pinch ring 7 forms the other portion of the gland housing. This pinch ring 7 has teeth 8 upon it adapted to engage with corresponding teeth on the ring 4 so that this rotates with it and consequently also the packing 3. The outer face of the ring 4 is recessed as shown to receive an annular pad of anti-friction metal or the like material 9 which may be pinned to it to prevent its rotating relatively to the ring 4. The surface of this pad 9 slides over a bearing surface on a ring 10 having a spherical seating in the plate 11 secured to the casing 2. This spherical seating may be lubricated in any desired manner, for instance by means of suitably formed lubrication channels 11' fed from a grease cup or the like. Wings such as 12 may be provided on the spherically seated ring 10, to move between pins 13, on the plate 11, so that while the ring may rock on its spherical seating to a certain extent, yet it cannot rotate and consequently the lubrication channels will not get out of alignment with one another.

Similarly the outer side of the pinch ring 7 may be provided with a radial bearing surface running over a bearing surface on an annular friction pad or ring 14, which is carried by a recess in a ring 15, supported by bolts 16 on the plate 11. This ring acts to take the reaction of the springs and consequently is important to maintain the correct alignment of the runner on the shaft 1 within its casing.

It will be seen that nuts 17 on these bolts 16 provide a ready means for adjusting the axial pressure of the packing previous to the securing of the pinch ring 7, fast on the shaft 1, by means of the usual set screws or bolts 18. Means such as a dowel pin 14' may also be provided to prevent the friction ring 14 from moving radially to the flange 15.

The ring 9 may if desired be made in two parts slightly tapered on their periphery as shown in Fig. 4 to fit into corresponding tapered recesses in the ring 4, so that as the parts are forced into position they will wedge tightly into this recess.

Instead of feeding lubricant on to the radial running surfaces through the spherical joint, as shown in Figures 1 and 2, the spherical joint may itself be mounted on the gland housing A as shown in Figure 3. In this event the other element 19 of the spherical joint is provided with a recess to receive a bearing ring 20 of anti-friction or the like material to which lubricant is led by passages 21. These passages are arranged in the flange ring 22. The flange ring then acts as a coacting bearing surface for the ring 20.

In Figure 5 a modification is shown in which a feather key 23 prevents rotation of the spherical joint ring 24, beyond predetermined limits and in this arrangement there is only one radial bearing surface instead of two as previously which surface corresponds to that between the pinch ring 7 and the annular friction pad or ring 14 in Fig. 1.

In this case lubrication is effected through a passage 25 on to the packing as it is not essential that passages should be cut or arranged within the spherical joint surfaces.

The arrangement of Figure 5, is particularly suitable for, for instance, Corliss valve spindles. It will also be suitable for arrangements such as for instance the rolls of calendering machines, in which case the shaft would be stationary and hollow whilst the rolls rotate co-axial with it, in each case, of course, the packing being fixed on the shaft.

In all cases it is preferred that the fluid pressure on the bearing packed, acts on the packing in the same direction as the direction of thrust of the springs 6.

We declare that what we claim is:—

1. A packing comprising a gland housing, a shaft, means to connect said gland housing to the shaft to rotate with it, a packing within said gland housing, a stationary casing, an element having a spherical surface and also a surface radial to the shaft, a ring having parallel surfaces radial to the shaft, one surface co-operating with the similar radial surface on the said element whilst the other radial surface and the spherical surface on said element co-operate respectively with similar surfaces on said gland housing and stationary casing.

2. A packing comprising a gland housing, a shaft, means to connect said housing to the shaft to rotate with it, a packing within said housing, a spring between said packing and a portion of said gland housing, an abutment ring outside said gland housing receiving its axial thrust, means connecting said ring to the stationary casing and elements having spherical and radial surfaces to the shaft interposed between said gland housing and said stationary casing.

3. A packing comprising a gland housing means to connect said housing to the shaft to rotate with it, a packing within said housing, a spring between said packing and said gland portion of housing, an abutment ring outside said gland housing, receiving its axial thrust, means connecting said ring to the stationary casing, rings having radial rubbing surfaces in contact with fixed elements, one of the said rings co-operating with a fixed element having a spherical surface on one side and a radial surface on the side of contact, the spherical surface co-operating with a similar surface on an adjacent part fixed relatively to it.

In witness whereof, we have hereunto signed our names this 12th day of August, 1920, in the presence of two subscribing witnesses.

WILLIAM EDGAR PLUMMER.
WILLIAM MARSDEN KERMODE.
CHARLES ST. CLAIR PLUMMER.
Witnesses:
   R. B. NICHOLLS,
   ABBOTT C. MARTIN.